United States Patent [19]

Brinn, Jr. et al.

[11] Patent Number: 5,299,776
[45] Date of Patent: Apr. 5, 1994

[54] IMPACT DAMPENED ARMATURE AND NEEDLE VALVE ASSEMBLY

[75] Inventors: Benjamin F. Brinn, Jr., Williamsburg; Gyula A. Huszar, Newport News, both of Va.

[73] Assignee: Siemens Automotive L.P., Auburn Hills, Mich.

[21] Appl. No.: 37,801

[22] Filed: Mar. 26, 1993

[51] Int. Cl.$^5$ ............................................. F16K 31/44
[52] U.S. Cl. .................................. 251/77; 251/129.16; 251/129.18; 251/129.19; 239/585.3
[58] Field of Search ................. 251/129.16, 129.19, 251/129.18, 77; 239/585.2, 585.3

[56] References Cited

U.S. PATENT DOCUMENTS

| | | | |
|---|---|---|---|
| 1,754,740 | 4/1930 | Clarkson | 251/129.16 |
| 2,504,428 | 4/1950 | Kimball | 251/129.19 |
| 2,930,404 | 3/1960 | Kowalski et al. | 251/129.16 |
| 4,878,650 | 11/1989 | Daly et al. | 251/129.15 |
| 5,033,716 | 7/1991 | Mesenich | 251/129.21 |
| 5,114,077 | 5/1992 | Cerny | 251/129.16 |
| 5,139,224 | 8/1992 | Bright | 251/129.15 |

Primary Examiner—A. Michael Chambers
Attorney, Agent, or Firm—George L. Boller; Russel C. Wells

[57] ABSTRACT

A small axial lost motion connection between an armature disk and a needle valve allows armature disk to snub rebound of needle valve upon impacting a valve seat.

5 Claims, 1 Drawing Sheet

IMPACT DAMPENED ARMATURE AND NEEDLE VALVE ASSEMBLY

FIELD OF THE INVENTION

This invention relates to an electrically operated needle valve, such as a solenoid operated fuel injector that injects fuel into an automobile engine.

BACKGROUND AND SUMMARY OF THE INVENTION

A phenomenon that is often present in an electrically operated needle valve is the needle valve bouncing that occurs when the needle valve closes on a seat. Where the needle valve is part of a solenoid operated fuel injector, the occurrence of such bouncing will typically result in an extra amount of unscheduled fuel being injected from the fuel injector into the engine, and this extra fuel can have an adverse effect on fuel economy and engine exhaust constituents. It is therefore desirable to eliminate such bouncing.

Various means for eliminating such bouncing have been proposed, including those found in commonly assigned U.S. Pat. Nos. 4,878,650; 5,033,176; and 5,139,224.

The present invention relates to an impact dampened armature and needle valve assembly wherein a very small amount of axial lost motion is provided between the armature and the needle valve so that when the needle valve impacts the valve seat at closing, the armature motion toward the seat is not immediately arrested, but rather will continue until it impacts a flange of the needle valve. By use of known computational and/or empirical techniques, the timing of the armature's impact with the needle valve flange can be set to occur just as the needle valve begins to bounce from the seat such that the armature substantially reduces or even fully cancels out the bounce.

An advantage of the invention is that no additional impact damping mechanism need be added to the needle valve and armature. All that is required is to axially capture the armature on the needle valve so that a small amount of axial lost motion travel of the former relative to the latter is present. The amount of such lost motion is quite small in the case of a fuel injector, and a dimension of the order of tens of millionths of an inch is typical. The attainment of such dimensions is possible with modern manufacturing techniques and materials.

The foregoing features, advantages, and benefits of the invention will be seen in the ensuing description and claims which are accompanied by a drawing. The drawing and description disclose a presently preferred embodiment of the invention according to the best mode contemplated at the present time for carrying out the invention.

DETAILED DESCRIPTION OF THE PREFERRED EMBODIMENT

Figure 1:
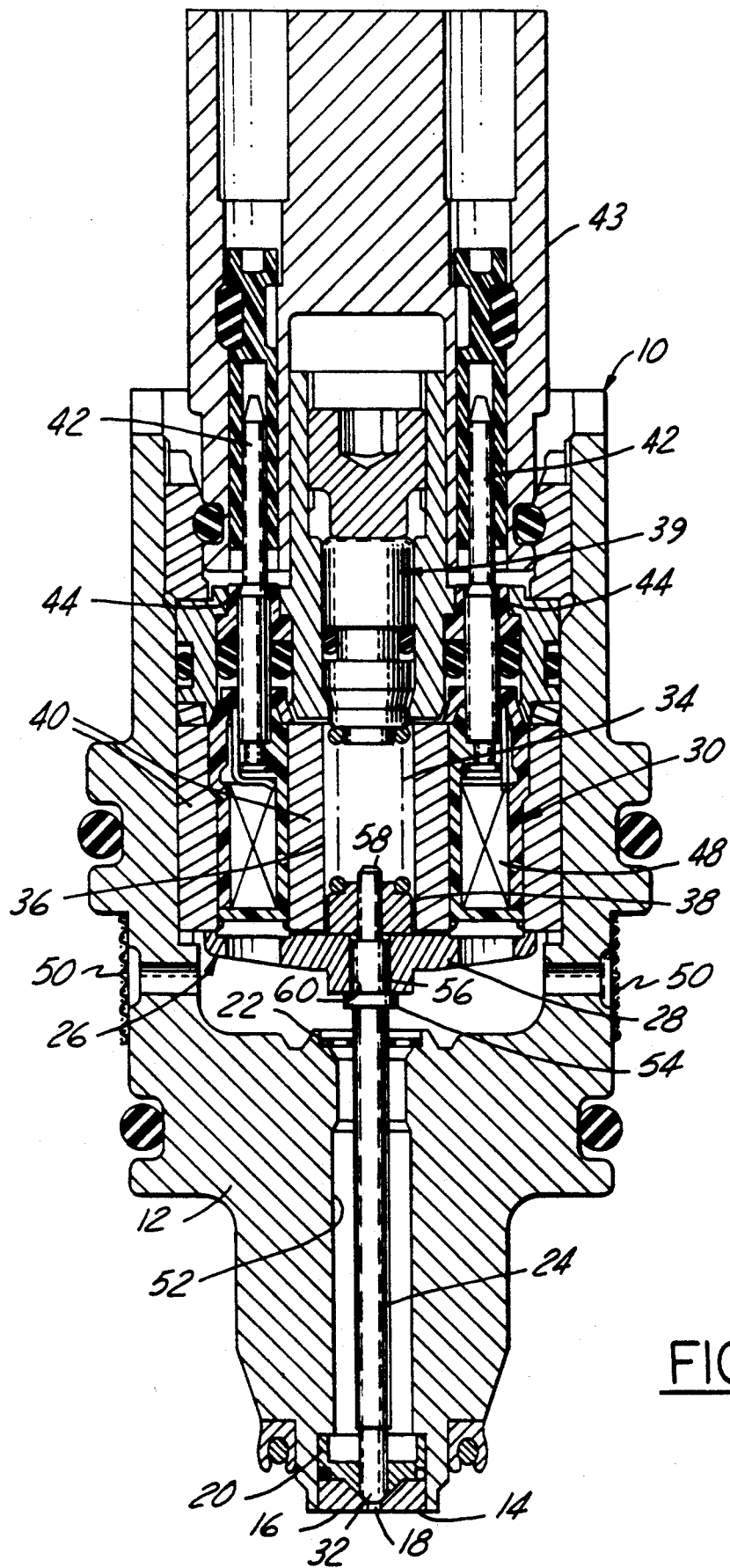
FIG. 1 is a longitudinal cross section through a representative fuel injector according to the present invention.

FIG. 1 shows a representative fuel injector 10 embodying principles of the invention. The fuel injector comprises a housing 12 having at its nozzle end a valve seat member 14 comprising a valve seat 16 that circumscribes an aperture 18. Within housing 12 just inside valve seat member 14 is a needle guide and fuel swirl member 20. In cooperation with an upper guide member 22, member 20 serves to guide the axial reciprocal motion of a needle valve 24 which forms a part of an armature and needle valve assembly 26. At its upper end as shown in FIG. 1, armature assembly 26 comprises an armature disk 28 that confronts an electrically operated solenoid 30. At its opposite end needle valve 24 comprises a rounded tip end 32 that is shown seated on valve seat 16 closing aperture 18. The needle valve is biased to this position by a spring 34 that is disposed in a bore 36 between a spring guide retainer 38 and a tension adjustment mechanism 39 that adjusts the spring bias force.

Solenoid 30 includes a stator 40, electric terminals 42 adapted for connection to a plug 43 leading to a control circuit (not shown) and passing through apertures 44 in an axial end wall of stator 40, and a coil 48 whose ends are connected via terminals 42. When coil 48 is energized by electric current via terminals 42, a magnetic field is generated within a magnetic circuit comprising stator 40, armature disk 28, and an intervening working gap to overcome the spring bias and displace armature and needle valve assembly 26 toward solenoid 20, thereby unseating tip 32 from seat 16 to allow fuel to pass through aperture 18. Pressurized fuel is introduced into the interior of the fuel injector via one or more fuel inlet ports 50 leading to a central axial passage 52 of housing 12.

Needle valve 24 comprises a radially outwardly directed circular flange 54 that is near the upper end of the needle valve. The needle valve extends upwardly from flange 54 as a circular cylinder 56 of given diameter, and beyond that as a further circular cylinder 58 of somewhat smaller diameter. Armature disk 28 comprises a central circular through-hole 60 that fits very closely onto cylinder 56. The axial dimension of through-hole 60 is slightly greater than that of cylinder 56, but the fit of the two is such that the armature can move axially on the cylinder without any significant tilting. In other words the armature executes essentially purely axial motion relative to the needle by virtue of the fit of cylinder 56 in through-hole 60.

Armature disk 28 is axially captured on needle valve 54 between flange 54 and spring guide retainer 38. The latter is a ring that has a press fit on cylinder 58. Spring guide retainer 38 is pushed onto needle valve 54 a distance that creates a desired amount of axial lost motion between the armature disk and the needle valve. Once that desired amount of axial lost motion has been attained, spring guide retainer 38 is joined to needle valve 24, such as by welding.

In the closed position of the fuel injector, spring 34 is pushing spring guide retainer 38 downwardly so that the tip end of the needle valve is forced closed on seat 16. Let it be assumed that the armature disk is abutting the flange at this time. Now when solenoid 30 is energized, armature disk 28 is attracted toward the lower end of the stator and will execute lost motion axially upwardly relative to the needle valve until it abuts spring guide member 38. Continuing upward travel of the armature disk now lifts the needle valve from the seat to open the valve.

When the energization of the solenoid ceases, spring 34 pushes the needle valve down toward seat 16. This will concurrently push armature disk 28 downwardly in unison with the needle valve because the armature disk remains in abutment with spring guide retainer 38. When the tip end of the needle valve impacts seat 16, the needle valve's downward motion is abruptly terminated. The lost motion connection between the needle valve and the armature disk prevents the termination of the needle motion from immediately affecting the armature disk so that the armature disk will continue to move downwardly until the lost motion is taken up. When the lost motion is taken up by virtue of the armature disk hitting flange 54, the impact of the armature disk with the flange will oppose incipient bounce of the needle valve off seat 16 such that needle bounce is substantially or even completely eliminated.

What is claimed is:

1. A valve comprising a housing having an inlet at which fluid enters the valve and an outlet at which fluid leaves the valve, a valve seat member that is disposed at said outlet and that comprises a valve seat circumscribing an aperture through which fluid passes as it leaves said outlet, an armature and needle valve assembly that comprises a needle valve and an armature and that is axially reciprocated by an electrically operated actuator mechanism to seat and unseat a tip end of said needle valve on and from said valve seat to thereby close and open said aperture to flow characterized in that said needle valve comprises a flange and in that an axial lost motion connection is provided between said armature and said needle valve such that when said needle valve impacts said valve seat to close said aperture to flow, said armature moves axially relative to said needle valve and after a certain amount of axial movement axially impacts said needle valve flange by direct contact therewith substantially at the incipiency of said needle valve bouncing away from said valve seat to thereby substantially snub such bounce.

2. A valve as set forth in claim 1 characterized further in that said armature is axially captured on said needle valve between said flange of said needle valve and a member that is assembled onto said needle valve, the amount of said lost motion being determined by the amount by which axial dimension between said flange and said member exceeds the axial dimension of said armature between said flange and said member.

3. A valve as set forth in claim 2 characterized further in that said needle valve comprises a circular cylindrical wall between said flange and said member, and said armature comprises a circular cylindrical hole through which said wall passes with a fit that allows said armature to move axially relative to said needle valve without any significant tilting.

4. A valve as set forth in claim 2 characterized further in that said member is press fit to said needle valve to create the desired amount of lost motion and is joined to said needle valve to maintain the desired amount of lost motion.

5. A valve as set forth in claim 1 wherein said valve is a solenoid operated fuel injector for injecting fuel into an engine for combustion.

* * * * *